(12) United States Patent
Nakai et al.

(10) Patent No.: US 8,318,343 B2
(45) Date of Patent: Nov. 27, 2012

(54) NONAQUEOUS ELECTROLYTE CELL AND POSITIVE ELECTRODE FOR SAME

(75) Inventors: Hideki Nakai, Fukushima (JP); Atsumichi Kawashima, Fukushima (JP); Akinori Kita, Fukushima (JP)

(73) Assignee: Sony Corporation, Tokyo (JP)

( * ) Notice: Subject to any disclaimer, the term of this patent is extended or adjusted under 35 U.S.C. 154(b) by 1493 days.

(21) Appl. No.: 11/781,776

(22) Filed: Jul. 23, 2007

(65) Prior Publication Data

US 2008/0032194 A1 Feb. 7, 2008

(30) Foreign Application Priority Data

Jul. 21, 2006 (JP) .................................. 2006-199887

(51) Int. Cl.
  *H01M 4/02* (2006.01)
  *H01M 4/13* (2010.01)
  *H01M 4/66* (2006.01)
  *H01M 4/68* (2006.01)

(52) U.S. Cl. ........................................ 429/209; 429/245

(58) Field of Classification Search .................. None
See application file for complete search history.

(56) References Cited

U.S. PATENT DOCUMENTS

| | | | | |
|---|---|---|---|---|
| 4,780,380 A * | 10/1988 | Prater | ............................ | 429/346 |
| 5,993,998 A * | 11/1999 | Yasuda | ..................... | 429/231.95 |
| 6,967,066 B2 | 11/2005 | Kameyama et al. | | |
| 2004/0023106 A1* | 2/2004 | Benson et al. | ................. | 429/122 |

FOREIGN PATENT DOCUMENTS

| | | |
|---|---|---|
| EP | 98/06666 | 2/1998 |
| JP | 6-75401 | 9/1994 |
| JP | 6-75402 | 9/1994 |
| JP | 07-192720 | 7/1995 |
| JP | 2001-283910 | 10/2001 |
| JP | 2001-500834 | 7/2007 |

* cited by examiner

*Primary Examiner* — Barbara Gilliam
*Assistant Examiner* — Adam A Arciero
(74) *Attorney, Agent, or Firm* — K&L Gates LLP

(57) ABSTRACT

A positive electrode having a positive-electrode active material and used for a nonaqueous electrolyte cell is provided. The positive electrode includes a coating, wherein the coating contains at least one first compound for which a binding-energy peak in a phosphorus 2p spectrum obtained by X-ray photoelectron spectroscopy is in the range of 132 to 135 eV.

13 Claims, 3 Drawing Sheets

NONAQUEOUS ELECTROLYTE CELL AND POSITIVE ELECTRODE FOR SAME

CROSS REFERENCES TO RELATED APPLICATIONS

The present application claims priority to Japanese Patent Application JP 2006-199887 filed in the Japanese Patent Office on Jul. 21, 2006, the entire contents of which are incorporated herein by reference.

BACKGROUND

The present disclosure relates to non-aqueous electrolyte cells and positive electrodes for non-aqueous electrolyte cells. Specifically, the present disclosure relates to a positive electrode for a nonaqueous electrolyte cell, the positive electrode including a coating containing a compound for which a peak in a phosphorus 2p spectrum obtained by X-ray photoelectron spectroscopy is within a predetermined region, and a nonaqueous electrolyte cell including the positive electrode.

In recent years, portable electronic devices, such as camcorders, video cameras, digital still cameras, cellular phones, personal digital assistants, and notebook computers, each achieving a reduction in size and weight have appeared one after another. Cells, in particular, secondary cells have been receiving attention as portable power supplies for such electronic devices. Intensive studies have been conducted to develop secondary cells with a higher energy density. As secondary cells having a high-energy density, lithium-ion secondary cells have been developed and are now in practical use.

Hitherto, in lithium-ion secondary cells, nonaqueous electrolytic solutions containing lithium salts dissolved in non-aqueous solvents have been used as ionic conductors. To prevent leakage of electrolytic solutions, metal cases need to be used as housings to reliably secure the hermeticity of cells.

However, when metal cases are used as housings, it is significantly difficult to make large-area thin sheet cells, small-area thin card cells, and flexible cells.

In place of electrolytic solutions, Japanese Unexamined Patent Application Publication No. 2001-283910 discloses a secondary cell including a nonaqueous gel electrolyte for which an electrolytic solution is retained in a polymer. In this secondary cell, there is no leakage of electrolytic solutions. Thus, a housing may be formed of, for example, a laminate film, thereby achieving a further reduction in size, weight, and thickness and achieving higher flexibility.

However, when housings are formed of laminate films and the like, cells may expand with gases generated by decomposition of electrolytic solutions during high-temperature storage. Therefore, there is still room for improvement.

It is desirable to provide a positive electrode for a nonaqueous electrolyte cell, the positive electrode being capable of inhibiting or preventing the cell from expanding, and a nonaqueous electrolyte cell including the positive electrode.

SUMMARY

According to an embodiment, there is provided a positive electrode including a coating containing a compound for which a binding-energy peak in a phosphorus 2p spectrum obtained by X-ray photoelectron spectroscopy is in the range of 132 to 135 eV.

A positive electrode having a positive-electrode active material and used for a nonaqueous electrolyte cell according to an embodiment includes a coating, wherein the coating contains at least one first compound for which a binding-energy peak in a phosphorus 2p spectrum obtained by X-ray photoelectron spectroscopy is in the range of 132 to 135 eV.

A nonaqueous electrolyte cell according to another embodiment includes a positive electrode containing a positive-electrode active material, a negative electrode containing a negative-electrode active material, a nonaqueous electrolyte containing an electrolyte salt, and a housing accommodating the positive electrode, the negative electrode, and the non-aqueous electrolyte, wherein the positive electrode includes a coating, the coating containing at least one first compound for which a binding-energy peak in a phosphorus 2p spectrum obtained by X-ray photoelectron spectroscopy is in the range of 132 to 135 eV, and wherein the electrolyte salt contains lithium hexafluorophosphate.

A nonaqueous electrolyte cell according to an embodiment includes a positive electrode containing a positive-electrode active material, a negative electrode containing a negative-electrode active material, a nonaqueous electrolyte containing an electrolyte salt, and a housing accommodating the positive electrode, the negative electrode, and the nonaqueous electrolyte, wherein the positive electrode includes a coating, the coating containing at least one first compound for which a binding-energy peak in a phosphorus 2p spectrum obtained by X-ray photoelectron spectroscopy is in the range of 132 to 135 eV, wherein the electrolyte salt contains lithium hexafluorophosphate, and wherein when the electrolyte salt is dissolved in a nonaqueous solvent, the electrolyte salt shows Lewis acid properties.

A nonaqueous electrolyte cell according to another embodiment includes a positive electrode containing a positive-electrode active material, a negative electrode containing a negative-electrode active material, a nonaqueous electrolyte containing an electrolyte salt, and a housing accommodating the positive electrode, the negative electrode, and the non-aqueous electrolyte, wherein the electrolyte salt contains lithium hexafluorophosphate and an electrolyte salt that shows Lewis acid properties when the electrolyte salt is dissolved in a nonaqueous solvent, and wherein the positive electrode includes a coating, the coating containing at least one first compound for which a binding-energy peak in a phosphorus 2p spectrum obtained by X-ray photoelectron spectroscopy is in the range of 132 to 135 eV and containing at least one second compound for which a binding-energy peak in a phosphorus 2p spectrum obtained by X-ray photoelectron spectroscopy is in the range of 135 to 138 eV, and the at least one second compound being formed by allowing the at least one first compound to react with the electrolyte salt.

Additional features and advantages are described herein, and will be apparent from, the following Detailed Description and the figures.

DETAILED DESCRIPTION

Figure 1:
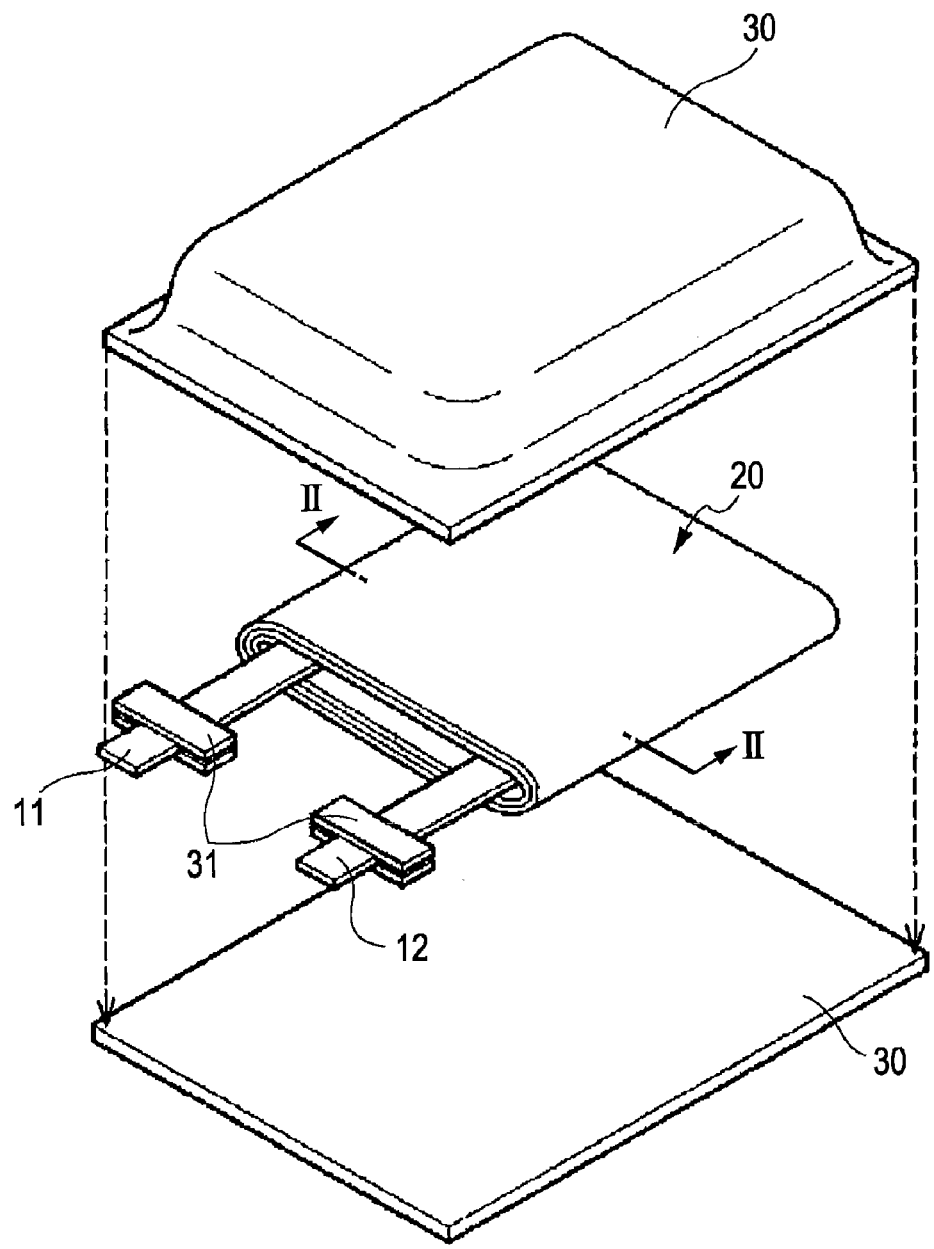
FIG. 1 is an exploded perspective view of a secondary cell including a laminate housing, the secondary cell being an example of a nonaqueous electrolyte cell according to an embodiment.

A positive electrode for a nonaqueous electrolyte cell according to an embodiment is described in detail below. In this specification and claims, the expression "%" refers to "percent by mass", unless otherwise stated.

A positive electrode for a nonaqueous electrolyte cell according to an embodiment contains a positive electrode active material. The positive electrode includes a coating. The coating contains a first compound for which a binding-energy peak in a phosphorus 2p spectrum obtained by X-ray photoelectron spectroscopy is in the range of 132 to 135 eV. The positive electrode for a nonaqueous electrolyte cell is suitably used for a lithium-ion nonaqueous electrolyte secondary cell.

The coating containing the first compound for which the binding-energy peak in the phosphorus 2p spectrum is in the range of 132 to 135 eV inhibits the decomposition reaction of the nonaqueous electrolyte and can thus inhibit or prevent the cell from expanding.

Examples of a compound for which a binding-energy peak in a phosphorus 2p spectrum is not in the range of 132 to 135 eV include lithium fluorophosphates, such as $Li_2PO_3F$ and $LiPO_2F_2$. These materials scarcely exert an effect of inhibiting the decomposition reaction of a nonaqueous electrolyte. The lithium fluorophosphates such as $Li_2PO_3F$ and $LiPO_2F_2$, for which a binding energy peak in a phosphorus 2p spectrum is in the range of 135 to 138 eV, are formed and detected when the first compound for which the binding energy peak in the phosphorus 2p spectrum is in the range of 132 to 135 eV has an effect of inhibiting the decomposition reaction of the nonaqueous electrolyte.

The above-described coating may be partially or entirely disposed on a surface of the positive electrode. For example, in a positive electrode including a positive-electrode current collector covered with a positive-electrode active material layer containing a positive-electrode active material, the coating may be partially or entirely disposed on a surface of the positive-electrode active material layer. In a positive electrode containing positive-electrode active material particles, the coating may be partially or entirely disposed on a surface of the positive-electrode active material layer. The coating may be partially or entirely disposed on surfaces of the positive-electrode active material particles.

Examples of the first compound for which the binding energy peak in the phosphorus 2p spectrum obtained by X-ray photoelectron spectroscopy is in the range of 132 to 135 eV, the compound being contained in the coating or constituting the coating, include compounds represented by general formula (1):

$$Li_\alpha H_\beta PO_3 \qquad (1)$$

(wherein α represents an integer of one or more; and β represents an integer of zero or more, and the relationship α+β=3 is satisfied).

Examples of the compounds represented by general formula (1) include lithium compounds each having a phosphite structure ($PO_3$). A typical example thereof is, but is not limited to, lithium hydrogen phosphite ($Li_2HPO_3$). That is, the compounds, such as $Li_3PO_3$ and $LiH_2PO_3$, for which a binding-energy peak in a phosphorus 2p spectrum is in the range described above and for which general formula (1) is satisfied may be used.

Furthermore, examples of the first compound for which the binding energy peak in the phosphorus 2p spectrum obtained by X-ray photoelectron spectroscopy is in the range of 132 to 135 eV, the first compound being contained in the coating or constituting the coating, include compounds represented by general formula (2):

$$Li_\gamma H_\delta PO_2 \qquad (2)$$

(wherein γ represents an integer of one or more; and δ represents an integer of zero or more, and the relationship γ+δ=3 is satisfied).

Examples of the compounds represented by general formula (2) include lithium compounds each having a hypophosphite structure ($PO_2$). A typical example thereof is, but is not limited to, lithium hypophosphite ($LiH_2PO_2$). That is, the compounds for which the binding-energy peak in the phosphorus 2p spectrum is in the range described above and for which general formula (2) is satisfied may be used. For example, $Li_2HPO_2$ and $Li_3PO_2$ may be used.

These compounds represented by general formulae (1) and (2) may be used individually or in any combination in any proportion.

In the positive electrode for a nonaqueous electrolyte cell according to an embodiment, the coating essentially contains the first compound for which the binding-energy peak in the phosphorus 2p spectrum obtained by X-ray photoelectron spectroscopy is in the range of 132 to 135 eV. The coating may further contain another component.

Specific examples of another component include second compounds for which a binding-energy peak in a phosphorus 2p spectrum obtained by X-ray photoelectron spectroscopy is in the range of 135 to 138 eV. The second compound for which the binding-energy peak in the phosphorus 2p spectrum is in the range of 135 to 138 eV is formed when the first compound for which the binding-energy peak in the phosphorus 2p spectrum is in the range of 132 to 135 eV is decomposed by a nonaqueous electrolyte, even if the second compound is not included during production.

Examples of the second compound for which the binding-energy peak in the phosphorus 2p spectrum obtained by X-ray photoelectron spectroscopy is in the range of 135 to 138 eV include compounds represented by general formula (3):

$$Li_\eta PO_\epsilon F_\xi \qquad (3)$$

(wherein ε represents an integer of one or more; ξ represents an integer of one or more; and η represents a natural number of three or less, and the relationship 2ε+ξ−η=5 is satisfied).

Examples of the compounds represented by general formula (3) include lithium fluorophosphates. A typical example thereof is, but is not limited to, $Li_2PO_3F$. That is, the compounds for which the binding-energy peak in the phosphorus 2p spectrum is in the range described above and for which general formula (3) is satisfied may be used. For example, $LiPO_2F_2$ may be used.

All of the second compounds represented by general formula (3) may be used alone or in any combination in any proportion.

A nonaqueous electrolyte cell according to an embodiment is described in detail below.

FIG. 1 is an exploded perspective view of an example of a nonaqueous-electrolyte secondary cell including a laminate housing, the secondary cell being an example of a nonaqueous electrolyte cell according to an embodiment.

Referring to FIG. 1, the nonaqueous electrolyte secondary cell includes a positive-electrode lead 11, a negative-electrode lead 12, a cell element 20 provided with the positive-electrode lead 11 and the negative-electrode lead 12, and a film housing 30 in which the cell element 20 is enclosed. The positive-electrode lead 11 and the negative-electrode lead 12 extend from the inside to the outside of the housing 30 and extend, for example, in the same direction. The positive-electrode lead 11 and the negative-electrode lead 12 are each composed of a metal material, such as aluminum (Al), copper (Cu), nickel (Ni), or stainless steel. The positive-electrode lead 11 and the negative-electrode lead 12 are each in the form of, for example, a thin plate or a network.

The housing 30 is formed of a rectangular laminate film in which, for example, a nylon film, aluminum foil, and a polyethylene film are laminated in that order. The housing 30 is disposed in such a manner that, for example, the polyethylene film side faces the cell element 20. The periphery of the housing 30 is connected by fusion or with an adhesive.

An adhesion film 31 for preventing the penetration of outside air is disposed between the housing 30 and the positive-electrode lead 11 and between the housing 30 and the negative-electrode lead 12. The adhesion film 31 is composed of a material having adhesion to the positive-electrode lead 11 and the negative-electrode lead 12. For example, when the positive-electrode lead 11 and the negative-electrode lead 12 are composed of the metal material described above, the adhesion film 31 is preferably composed of a polyolefin resin, e.g., polyethylene, polypropylene, modified polyethylene, or modified polypropylene.

The housing 30 may have another structure. That is, the housing 30 may be formed of, for example, a laminate film that does not contain a metal material, a polymer film such as polypropylene, or a metal film, in place of the laminate film.

In general, the laminate film has a laminated structure of outer layer/metal foil/sealant layer. Each of the outer layer and the sealant layer may be formed of a plurality of sublayers. In the above-described example, the nylon film corresponds to the outer layer. The aluminum foil corresponds to the metal foil. The polyethylene film corresponds to the sealant layer.

Any metal foil may be used as long as the metal foil functions as a moisture-impermeable barrier. Stainless steel foil, nickel foil, and iron foil with a plating film may be used in addition to aluminum foil. Aluminum foil, which has a small thickness, lightness in weight, and satisfactory processability, can be suitably used.

Examples of the structure of the housing usable are listed below in "outer layer/metal foil/sealant layer" format: Ny (nylon)/Al (aluminum)/CPP (cast polypropylene); PET (polyethylene terephthalate)/Al/CPP; PET/Al/PET/CPP; PET/Ny/Al/CPP; PET/Ny/Al/Ny/CPP; PET/Ny/Al/Ny/PE (polyethylene); Ny/PE/Al/LLDPE (linear low-density polyethylene); PET/PE/Al/PET/LDPE (low-density polyethylene); and PET/Ny/Al/LDPE/CPP.

Figure 2:
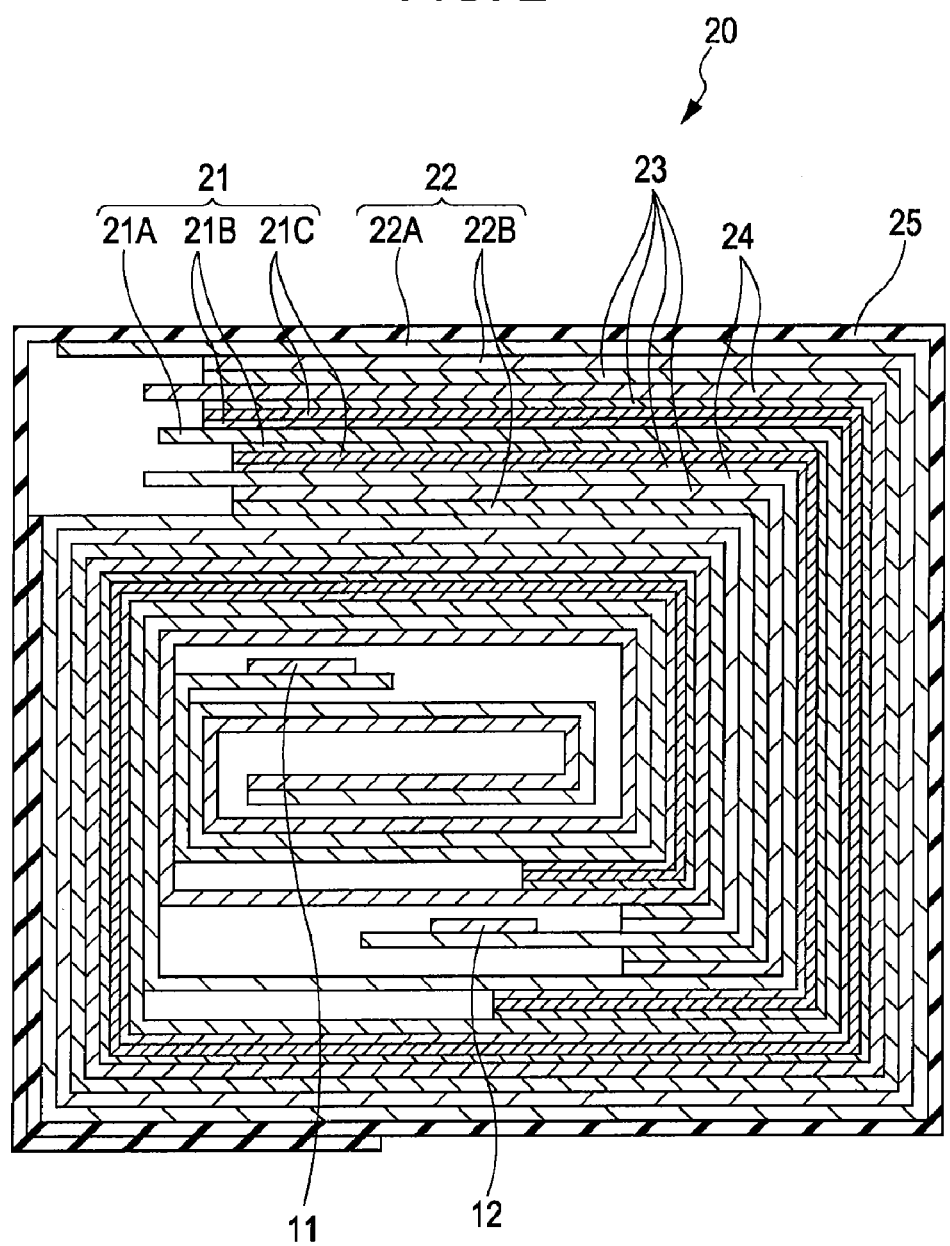
FIG. 2 is a cross-sectional view of the cell element, the view being taken along line II-II shown in FIG. 1.

FIG. 2 is a cross-sectional view of the cell element 20 shown in FIG. 1, the view being taken along line II-II. In FIG. 2, the cell element 20 has a structure including a positive electrode 21, a negative electrode 22, nonaqueous electrolyte layers 23 each composed of a nonaqueous electrolyte, and separators 24, the positive electrode 21 being disposed opposite the negative electrode 22 with the nonaqueous electrolyte layers 23 and the separators 24 between the positive electrode 21 and the negative electrode 22, and all of these layers being rolled together. The periphery of the cell element 20 is protected with a protective tape 25.

The positive electrode 21 has a structure including a positive-electrode current collector 21A having a pair of faces opposite to each other; and at least one positive-electrode active material layer 21B, one or both faces of the positive-electrode current collector 21A being covered with the positive-electrode active material layers 21B. The positive-electrode current collector 21A has an exposed portion that is located at an end thereof in the longitudinal direction and that is not covered with the positive-electrode active material layer 21B. The positive-electrode lead 11 is attached to the exposed portion.

The positive-electrode current collector 21A is formed of metal foil, such as, aluminum foil, nickel foil, or stainless steel foil.

The positive-electrode active material layer 21B contains at least one positive-electrode material as a positive-electrode active material, the positive-electrode material being capable of storing and releasing lithium. According to need, the positive-electrode active material layer 21B may further contain a conducting agent and a binder.

Examples of the positive-electrode material capable of storing and releasing lithium include disulfides, such as sulfur (S), iron disulfide ($FeS_2$), titanium disulfide ($TiS_2$), molybdenum disulfide ($MOS_2$); chalcogenides not containing lithium (in particular, layered compounds and spinel compounds), such as niobium diselenide ($NbSe_2$), vanadium oxide ($V_2O_5$), titanium dioxide ($TiO_2$), and manganese dioxide ($MnO_2$); lithium-containing compounds; and conductive polymers, such as polyaniline, polythiophene, polyacetylene, and polypyrrole.

Among these compounds, lithium-containing compounds are preferred because some of the lithium-containing compounds provide a high voltage and a high-energy density. Examples of the lithium-containing compounds include lithium composite oxides each having lithium and a transition metal element; and lithium phosphates each having lithium and a transition metal element. From the viewpoint of higher voltages, lithium-containing compounds having cobalt (Co), nickel (Ni), manganese (Mn), iron (Fe), aluminum (Al), copper (Cu), zinc (Zn), chromium (Cr), vanadium (V), or titanium (Ti); or any mixture thereof are preferred. In particular, lithium-containing compounds having cobalt, nickel, or manganese; or any mixture thereof are preferred.

Typical lithium-containing compounds are represented by general formula (4) or general formula (5):

$$Li_xM^IO_2 \quad (4)$$

$$Li_yM^{II}PO_4 \quad (5)$$

(wherein $M^I$ and $M^{II}$ each represent at least one type of transition metal element; and values of x and y vary in response to charge and discharge states of a cell, and the value of x is usually in the range of 0.05 to 1.10, and the value of y is usually in the range of 0.05 to 1.10). In general, compounds of general formula (4) each have a layered structure, and compounds of general formula (5) each have the olivine structure.

Specific examples of the lithium composite oxides include lithium-cobalt composite oxides ($Li_xCoO_2$), lithium-nickel composite oxides ($Li_xNiO_2$), lithium-nickel-cobalt composite oxides ($Li_xNi_{1-v}Co_vO_2$ (v<1)), and lithium-manganese composite oxides ($Li_xMn_2O_4$) each having the spinel structure.

Specific examples of the lithium phosphates each having lithium and a transition metal element include lithium iron phosphate ($LiFePO_4$) having the olivine structure; and lithium iron manganese phosphate ($LiFe_{1-z}Mn_zPO_4$ (z<1)) having the spinel structure.

Examples of the conducting agent include carbon materials, such as graphite, carbon black, and Ketjenblack. In addition to the carbon materials, conductive materials, such as metal materials and conductive polymer materials may also be used. Examples of the binder include synthetic rubber, such as styrene-butadiene rubber, fluorocarbon rubber, and ethylene-propylene-diene rubber; and polymer materials such as polyvinylidene fluoride.

The positive electrode 21 includes a coating 21C on a surface of the positive-electrode active material layer 21B. As described above, the coating 21C contains the at least one first compound for which the binding-energy peak in the phosphorus 2p spectrum obtained by X-ray photoelectron spectroscopy is in the range of 132 to 135 eV. The coating 21C may contain the at least one first compound for which the binding-energy peak in the phosphorus 2p spectrum obtained by X-ray photoelectron spectroscopy is in the range of 132 to 135 eV. Two or more types of the first compounds may be contained in the coating 21C. The coating 21C may further contain another component.

Examples of another component include, as described above, the second compounds for which the binding-energy peak in the phosphorus 2p spectrum obtained by X-ray photoelectron spectroscopy is in the range of 135 to 138 eV.

The coating 21C preferably has a thickness of, for example, 100 nm or less. A thickness exceeding 100 nm may increase electrode resistance.

The negative electrode 22 has a structure similar to the structure of the positive electrode 21 and including a negative-electrode current collector 22A having a pair of faces opposite to each other; and at least one negative-electrode active material layer 22B, one or both faces of the negative-electrode current collector 22A being covered with the negative-electrode active material layer 22B. The negative-electrode current collector 22A has an exposed portion that is located at an end thereof in the longitudinal direction and that is not covered with the negative-electrode active material layer 22B. The negative-electrode lead 12 is attached to the exposed portion.

The negative-electrode current collector 22A is formed of metal foil, such as copper foil, nickel foil, or stainless steel foil.

The negative-electrode active material layer 22B contains at least one material selected from metal lithium and negative-electrode materials, as a negative-electrode active material, the negative-electrode materials being capable of storing and releasing lithium. According to need, the negative-electrode active material layer 22B may further contain a conducting agent and a binder.

Examples of the negative-electrode material capable of storing and releasing lithium include carbon materials. Carbon materials are preferred because of a significantly small change in crystal structure during charging and discharging, high charge and discharge capacities, and satisfactory cycling characteristics.

Examples of the carbon materials include graphite, non-graphitizable carbon materials, and graphitizable carbon materials. Specific examples of the carbon materials include pyrolytic carbon, coke, graphite, glassy carbon, materials obtained by burning organic polymers, carbon fibers, activated carbon, and carbon black.

Examples of coke include pitch coke, needle coke, and petroleum coke. The term "materials obtained by burning organic polymers" refer to materials carbonized by burning polymer materials, such as phenol resins and furan resins, at a proper temperature.

In particular, graphite is preferred because of a high electrochemical equivalent and a high energy density.

Graphite may be natural graphite or synthetic graphite. For example, graphite preferably has a true density of 2.10 g/cm$^3$ or more and more preferably 2.18 g/cm$^3$ or more.

To obtain such a true density, the thickness of the c-axis crystallite of the (002) plane needs to be 14.0 nm or more. The spacing of the (002) plane is preferably less than 0.340 nm and more preferably in the range of 0.335 to 0.337 nm.

Examples of the negative-electrode material capable of storing and releasing lithium also include materials each containing at least one element selected from metal elements and metalloid elements capable of forming alloys with lithium.

The negative-electrode material may be a metal element, a metalloid element, an alloy thereof, or a compound thereof. Alternatively, the negative-electrode material may at least partially contain one or more phases thereof.

According to an embodiment, examples of the alloy include alloys composed of at least two metal elements; and alloys composed of at least one metal element and at least one metalloid element. Furthermore, the alloy may contain a non-metallic element. Examples of the structure of the alloy include solid solutions, eutectics (eutectic mixtures), and intermetallic compounds, and structures in which at least two structures thereof coexist.

Examples of the metal element or the metalloid element include tin (Sn), lead (Pb), magnesium (Mg), aluminum (Al), indium (In), silicon (Si), zinc (Zn), antimony (Sb), bismuth (Bi), gallium (Ga), germanium (Ge), arsenic (As), silver (Ag), hafnium (Hf), zirconium (Zr), and yttrium (Y).

Among these, the metal elements and metalloid elements in Group 14 of the periodic table are preferred. Silicon and tin are most preferred because they each have a significant ability to store and release lithium and thus they achieve a high energy density.

Examples of alloys of tin include alloys each containing, as an element other than tin, at least one element selected from the group consisting of silicon, magnesium, nickel, copper, iron, cobalt, manganese, zinc, indium, silver, titanium (Ti), germanium, bismuth, antimony, and chromium (Cr).

Examples of alloys of silicon include alloys each containing, as an element other than silicon, at least one element selected from the group consisting of tin, magnesium, nickel, copper, iron, cobalt, manganese, zinc, indium, silver, titanium, germanium, bismuth, antimony, and chromium.

Examples of a tin compound and a silicon compound include tin compounds and silicon compounds each containing at least one selected from oxygen (O) and carbon (C). The tin compounds and the silicon compounds may further contain the above-described element other than silicon and tin.

An element, such as titanium, capable of forming a composite oxide with lithium may also be used as the above-described negative-electrode material. Metal lithium may be deposited and dissolved. Magnesium and aluminum, which are elements other than lithium, may also be deposited and dissolved.

Furthermore, examples of the negative-electrode material capable of storing and releasing lithium include metal oxides and polymers.

Examples of the metal oxides include iron oxide, ruthenium oxide, and molybdenum oxide. Examples of the polymers include polyacetylene and polypyrrole.

Each of the separators 24 is formed of, for example, an insulating thin film, such as a synthetic-resin porous film composed of a fluorocarbon, e.g., polytetrafluoroethylene, or a polyolefin, e.g., polypropylene or polyethylene, or a porous film composed of an inorganic ceramic material, the insulating thin film having high ion permeability and predetermined mechanical strength. Alternatively, each separator 24 may have a structure in which the two or more porous films are stacked. The separator 24 including a porous film composed of a polyolefin synthetic resin is preferred because the porous film has a satisfactory effect of inhibiting a short circuit between the positive electrode 21 and the negative electrode 22 and has a shutdown effect to improve safety of the cell.

In particular, polyethylene can exert the shutdown effect at a temperature in the range of 100° C. to 160° C. and has satisfactory electrochemical stability. Thus, polyethylene is desirable as a material constituting the separators 24. Polypropylene is also desirable. Furthermore, a copolymer or a mixture of a resin having chemical stability and either polyethylene or polypropylene may be used.

The nonaqueous electrolyte layers 23 are each formed of a polymer retaining a nonaqueous electrolytic solution, i.e., the nonaqueous electrolyte layers 23 are each formed of a nonaqueous gel electrolyte. Examples of the polymer include polyacrylonitrile, polyvinylidene fluoride, copolymers of polyvinylidene fluoride and polyhexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, styrene-butadiene rubber, nitrile-butadiene rubber, polystyrene, and polycarbonate. In particular, a polymer having a structure of polyacrylonitrile, polyvinylidene fluoride, polyhexafluoropropylene, polyethylene oxide, or the like is desirably used from the viewpoint of electrochemical stability.

The nonaqueous electrolytic solution contains, for example, a nonaqueous solvent and an electrolyte salt containing at least lithium hexafluorophosphate. According to need, the nonaqueous electrolytic solution may further contain various additives. Examples of the nonaqueous solvent include propylene carbonate, ethylene carbonate, diethyl carbonate, dimethyl carbonate, 1,2-dimethoxyethane, 1,2-diethoxyethane, γ-butyrolactone, tetrahydrofuran, 1,3-dioxolane, 4-methyl-1,3-dioxolane, diethyl ether, sulfolane, methylsulfolane, acetonitrile, propionitrile, vinylene carbonate, linear halogenated carbonates, and cyclic halogenated carbonates. These nonaqueous solvents may be used alone or as a mixture of two or more.

The electrolyte salt is not particularly limited as long as it contains lithium hexafluorophosphate. For example, the electrolyte salt desirably has a satisfactory effect of decomposing the coating containing the first compound for which the binding-energy peak in the phosphorus 2p spectrum obtained by X-ray photoelectron spectroscopy is in the range of 132 to 135 eV. Examples of the electrolyte salt include lithium tetrafluoroborate ($LiBF_4$), lithium hexafluoroarsenate ($LiAsF_6$), lithium tetraphenylborate ($LiB(C_6H_5)_4$), lithium chloride (LiCl), lithium bromide (LiBr), lithium methanesulfonate ($LiCH_3SO_3$), and lithium trifluoromethanesulfonate ($LiCF_3SO_3$), in addition to lithium hexafluorophosphate. A mixture of lithium hexafluorophosphate ($LiPF_6$) and at least one of these electrolyte salts may be used.

The electrolyte salt is not particularly limited as long as it contains lithium hexafluorophosphate. When the electrolyte salt is dissolved in the nonaqueous solvent, the electrolyte salt desirably shows Lewis acid properties.

Examples of the electrolyte salt include lithium tetrafluoroborate ($LiBF_4$) and lithium hexafluoroarsenate ($LiAsF_6$), in addition to lithium hexafluorophosphate ($LiPF_6$). Among these compounds, lithium hexafluorophosphate is preferably used from the viewpoint of high ionic conductivity. A mixture of lithium hexafluorophosphate ($LiPF_6$) and at least one of these electrolyte salts may be used.

The electrolyte salt is not particularly limited as long as it contains lithium hexafluorophosphate. The electrolyte salt need not have a satisfactory effect of decomposing the coating containing the first compound for which the binding-energy peak in the phosphorus 2p spectrum obtained by X-ray photoelectron spectroscopy is in the range of 132 to 135 eV. Examples of the electrolyte salt include lithium perchlorate ($LiClO_4$). The electrolyte salt may also be used as a mixture with the above-described electrolyte salt.

The nonaqueous electrolyte may contain the first compound for which the binding-energy peak in the phosphorus 2p spectrum obtained by X-ray photoelectron spectroscopy is in the range of 132 to 135 eV. Alternatively, the nonaqueous electrolyte may contain a precursor that forms the first compound by reaction induced by heat, the passage of electric current, or the like.

Examples of the precursor include compounds having phosphorous structure ($PO_3$) or hypophosphorous structure ($PO_2$), for example, phosphorous acid ($H_3PO_3$), hypophosphorous acid ($H_3PO_2$), phenylphosphinic acid ($C_6H_5$—PH(O)—OH), and diphenyl phosphonate ($C_6H_5O$—PH(O)—$OC_6H_5$).

An example of a method for producing the nonaqueous-electrolyte cell is described below.

The above-described nonaqueous electrolyte secondary cell having the laminate housing can be produced as described below.

The positive electrode 21 is formed. When positive-electrode active material particles are used, a positive-electrode mixture of the positive-electrode active material and, if needed, a conducting agent and a binder is prepared. The resulting mixture is dispersed in a dispersant such as N-methyl-2-pyrrolidone to form a positive-electrode mixture slurry.

The resulting slurry is applied to the positive-electrode current collector 21A, dried, and compression-molded to form the positive-electrode active material layer 21B.

The coating 21C that contains the first compound for which the binding-energy peak in the phosphorus 2p spectrum obtained by X-ray photoelectron spectroscopy is in the range of 132 to 135 eV is formed on a surface of the positive-electrode active material layer 21B.

The coating 21C may be directly formed by spin coating or vapor deposition. Alternatively, the coating 21C may be formed by forming a coating containing the precursor that forms the first compound for which the binding-energy peak in the phosphorus 2p spectrum obtained by X-ray photoelectron spectroscopy is in the range of 132 to 135 eV by spin coating or vapor deposition and then inducing the reaction of the precursor by heat or the like.

The coating 21C may also be electrochemically formed. For example, the coating 21C may be formed by dissolving the first compound for which the binding-energy peak in the phosphorus 2p spectrum obtained by X-ray photoelectron spectroscopy is in the range of 132 to 135 eV in an electrolytic solution containing an electrolyte salt dissolved in a solvent and then passing an electric current therethrough. Alternatively, for example, the coating 21C may be formed by dissolving the precursor that forms the first compound for which the binding-energy peak in the phosphorus 2p spectrum obtained by X-ray photoelectron spectroscopy is in the range of 132 to 135 eV in an electrolytic solution and then inducing the reaction of the precursor by passing an electric current therethrough.

The negative electrode 22 is formed. For example, when negative-electrode active material particles are used, a negative-electrode mixture of the negative-electrode active material and, if needed, a conducting agent and a binder is prepared. The resulting mixture is dispersed in a dispersant such as N-methyl-2-pyrrolidone to form a negative-electrode mixture slurry. The resulting slurry is applied to the negative-electrode current collector 22A, dried, and compression-molded to form the negative-electrode active material layer 22B.

A nonaqueous electrolyte containing a polymer and a nonaqueous electrolytic solution containing an electrolyte salt such as lithium hexafluorophosphate and a nonaqueous solvent is applied onto either the separators 24 or the positive electrode 21 and the negative electrode 22 to form the nonaqueous electrolyte layers 23. The positive-electrode lead 11 is attached to the positive electrode 21. The negative-electrode lead 12 is attached to the negative electrode 22. The separator 24, the positive electrode 21, the separator 24, and the negative electrode 22 are stacked in that order and rolled. The protective tape 25 is bonded to the periphery to form the cell element 20. The cell element 20 is placed in the housing 30. The periphery is heat-sealed. Thereby, the nonaqueous electrolyte secondary cell including the laminate housing as shown in FIGS. 1 and 2 is completed.

The nonaqueous electrolyte secondary cell including the laminate housing may be produced as described below.

For example, the cell is not fabricated after the formation of the coating 21C. That is, the coating 21C may be formed by adding the first compound for which the binding-energy peak in the phosphorus 2p spectrum obtained by X-ray photoelectron spectroscopy is in the range of 132 to 135 eV or the precursor that forms the first compound by reaction to a nonaqueous electrolyte constituting each nonaqueous electrolyte layer 23, fabricating a cell, and charging the cell. Thereby, the nonaqueous electrolyte secondary cell including the laminate housing as shown in FIGS. 1 and 2 is completed.

The nonaqueous electrolyte secondary cell including the laminate housing may also be produced as described below.

For example, rolling is not performed after the formation of the nonaqueous electrolyte layers 23 by the application of a nonaqueous electrolyte on either the separators 24 or the positive electrode 21 and the negative electrode 22. That is, the positive-electrode lead 11 is attached to the positive electrode 21. The negative-electrode lead 12 is attached to the negative electrode 22. Then the separator 24, the positive electrode 21, the separators 24, and the negative electrode 22 are laminated in that order. The resulting laminate is rolled. The protective tape 25 is bonded to the periphery to form a rolled electrode member. The resulting rolled electrode member is placed in the housing 30. Peripheral sides except one side are heat-sealed to form a bag.

An electrolytic solution containing an electrolyte salt such as lithium hexafluorophosphate and a nonaqueous solvent such as ethylene carbonate is prepared. A nonaqueous electrolyte containing a polymerizable monomer is prepared. The electrolytic solution and the nonaqueous electrolyte are injected into the rolled electrode member through the opening of the housing 30. The opening is then heat-sealed. Thereby, the nonaqueous electrolyte layers 23 are formed to complete the nonaqueous electrolyte secondary cell including the laminate housing as shown in FIGS. 1 and 2.

In the nonaqueous electrolyte secondary cell described above, when the cell is charged, for example, lithium ions are released from the positive-electrode active material layer 21B of the positive electrode 21, passed through the nonaqueous electrolyte layers 23, and stored in the negative-electrode active material layer 22B of the negative electrode 22. When the cell is discharged, for example, lithium ions are released from the negative-electrode active material layer 22B of the negative electrode 22, passed through the nonaqueous electrolyte layers 23, and stored in the positive-electrode active material layer 21B of the positive electrode 21.

In known nonaqueous electrolyte secondary cells, in some cases, nonaqueous electrolytes are decomposed during charge and discharge to generate gases that expand the cells. In the nonaqueous electrolyte secondary cell according to an embodiment, the coating 21C containing the first compound for which the binding-energy peak in the phosphorus 2p spectrum obtained by X-ray photoelectron spectroscopy is in the range of 132 to 135 eV is formed on the surface of the positive-electrode active material layer 21B of the positive electrode 21. Thus, it is speculated that the nonaqueous electrolyte is not easily decomposed to suppress gas generation; hence, the expansion of the cell is suppressed or prevented.

Furthermore, the first compound for which the binding-energy peak in the phosphorus 2p spectrum obtained by X-ray photoelectron spectroscopy is in the range of 132 to 135 eV tends to be preferentially decomposed compared with the nonaqueous electrolyte. It is speculated that the first compound for which the binding-energy peak in the phosphorus 2p spectrum obtained by X-ray photoelectron spectroscopy is in the range of 132 to 135 eV is decomposed to form the second compound for which a binding-energy peak in a phosphorus 2p spectrum obtained by X-ray photoelectron spectroscopy is in the range of 135 to 138 eV, thereby suppressing the generation of a gas; hence the expansion of the cell is suppressed or prevented.

The first compound for which the binding-energy peak in the phosphorus 2p spectrum obtained by X-ray photoelectron spectroscopy is in the range of 132 to 135 eV is also decomposed in a high-temperature environment. Also in this case, the first compound is decomposed to form the second compound for which a binding-energy peak in a phosphorus 2p spectrum obtained by X-ray photoelectron spectroscopy is in the range of 135 to 138 eV, thereby suppressing the generation of a gas. Hence, the expansion of the cell can be suppressed.

EXAMPLES

The embodiments will now be described in further detail by means of non-limiting Examples and Comparative Examples.

Specifically, operations as described in Examples and Comparative Examples below were made to produce nonaqueous electrolyte secondary cells including laminate housing as shown in FIGS. 1 and 2. Then the performance of the resulting cells was evaluated.

Examples 1-1

First, 91 parts by mass of a lithium-cobalt composite oxide ($LiCoO_2$) powder as a positive-electrode active material, 6 parts by mass of graphite as a conducting agent, and 3 percent by mass of polyvinylidene fluoride as a binder were mixed and dispersed in N-methyl-2-pyrrolidone as a dispersant to form a positive-electrode mixture slurry.

The resulting positive-electrode mixture slurry was applied to aluminum foil as a positive-electrode current collector, dried, and compression-molded to form a positive-electrode active material layer. A lithium hydrogen phosphite ($Li_2HPO_3$) solution was applied on the positive-electrode active material layer by spin coating and dried in vacuum to form a coating, thereby forming a positive electrode including the coating.

Next, 90 parts by mass of an artificial graphite powder as a negative-electrode active material and 10 parts by mass of polyvinylidene fluoride as a binder were mixed and dispersed in N-methyl-2-pyrrolidone as a dispersant to form a negative-electrode mixture slurry. The resulting negative-electrode mixture slurry was applied on copper foil as a negative-electrode current collector, dried, and compression-molded to form a negative-electrode active material layer, thereby forming a nonaqueous electrolyte.

A nonaqueous electrolyte containing a polymer and a nonaqueous electrolytic solution containing an electrolyte salt and a nonaqueous solvent was applied on the positive electrode and the nonaqueous electrolyte to form nonaqueous electrolyte layers.

A mixed solvent of 20:20:30:30:1 ethylene carbonate/propylene carbonate/ethylmethyl carbonate/diethyl carbonate/vinylene carbonate (volume ratio) was prepared as the nonaqueous solvent. Lithium hexafluorophosphate ($LiPF_6$) was prepared as the electrolyte salt. The nonaqueous electrolytic solution was made by dissolving the electrolyte salt in the nonaqueous solvent so as to have a concentration of 0.9 mol/kg.

A copolymer of vinylidene fluoride and hexafluoropropylene was used as the polymer.

A positive-electrode lead and a negative-electrode lead were attached to the positive electrode and the nonaqueous electrolyte, respectively. The positive electrode and the nonaqueous electrolyte were laminated with separators. The resulting laminate was rolled to form a cell element. The cell element was placed in a housing formed of a laminate film to form a nonaqueous electrolyte secondary cell according to this embodiment.

Example 1-2

A nonaqueous electrolyte secondary cell according to Example 1-2 was prepared as in Example 1-1, except that a lithium hypophosphite ($LiH_2PO_2$) solution was applied in place of the lithium hydrogen phosphite ($Li_2HPO_3$) solution when the coating was formed.

Comparative Example 1-1

A nonaqueous electrolyte secondary cell according to Comparative Example 1-1 was prepared as in Example 1-1, except that the coating was not formed.

Comparative Example 1-2

A nonaqueous electrolyte secondary cell according to Comparative Example 1-2 was prepared as in Example 1-1, except that lithium perchlorate ($LiClO_4$) was used in place of lithium hexafluorophosphate ($LiPF_6$) as the electrolyte salt and that the coating was not formed.

Comparative Example 1-3

A nonaqueous electrolyte secondary cell according to Comparative Example 1-3 was prepared as in Example 1-1, except that lithium perchlorate ($LiClO_4$) was used in place of lithium hexafluorophosphate ($LiPF_6$) as the electrolyte salt.

Comparative Example 1-4

A nonaqueous electrolyte secondary cell according to Comparative Example 1-4 was prepared as in Example 1-2, except that lithium perchlorate ($LiClO_4$) was used in place of lithium hexafluorophosphate ($LiPF_6$) as the electrolyte salt. Table 1 shows specifications of Examples and Comparative Examples.

Performance Evaluation

In each of the nonaqueous electrolyte secondary cells according to Examples and Comparative Examples, the initial capacity, the amount of expansion during high-temperature storage, and the capacity retention rate were examined.

The term "initial capacity" refers to a discharge capacity in the first cycle of a charge/discharge operation at 23° C. With respect to a charge, a constant current charge was continued at a constant current of 1 C until the cell voltage reaches 4.2 V. Then constant voltage charge was continued at 4.2 V until the current reaches 1 mA. With respect to a discharge, a constant current discharge was continued at a constant current of 1 C until the cell voltage reaches 3.0 V. The term "1 C" refers to a current value when the theoretical capacity is completely discharged for one hour.

The amount of expansion during the high-temperature storage was determined as follows: After one cycle of the charge/discharge operation was performed under the above-described conditions and then the thickness of the cell was measured before storage, the cell was recharged. The resulting cell was stored at 90° C. for 4 hours. The thickness of the cell after storage was measured. The thickness of the cell after storage was subtracted from the thickness of the cell before storage to obtain the amount of expansion.

The capacity retention rate after the high-temperature storage was determined as follows: After one cycle of the charge/discharge operation was performed under the above-described conditions, the cell was recharged. The resulting cell was stored at 90° C. for 4 hours. The cell was discharged again under the above-described conditions. The capacity after storage was measured. The ratio (%) of the capacity after storage to the initial capacity was measured. The results were summarized in Table 1.

TABLE 1

| | Type of electrolyte salt | Coating | Initial capacity (mAh) | Amount of expansion (mm) | Capacity retention rate after high-temperature storage (%) |
|---|---|---|---|---|---|
| Example 1-1 | $LiPF_6$ | Present | 862 | 0.3 | 92.5 |
| Example 1-2 | $LiPF_6$ | Present | 863 | 0.2 | 92.6 |
| Comparative Example 1-1 | $LiPF_6$ | Absent | 860 | 1.1 | 91.3 |
| Comparative Example 1-2 | $LiClO_4$ | Absent | 861 | 3.2 | 91.6 |
| Comparative Example 1-3 | $LiClO_4$ | Absent | 859 | 3.6 | 91.1 |
| Comparative Example 1-4 | $LiClO_4$ | Absent | 858 | 3.5 | 91.0 |

Each of the nonaqueous electrolyte secondary cells produced in Examples 1-1 and 1-2 were disassembled after one cycle of the charge/discharge operation was performed. The positive electrode was removed, rinsed with dimethyl carbonate, and dried in vacuum. The resulting positive electrode was analyzed by X-ray photoelectron spectroscopy.

Furthermore, each of the nonaqueous electrolyte secondary cells produced in Examples 1-1 and 1-2 was disassembled after one cycle of the charge/discharge operation was performed and then the cell was stored at 90° C. for 4 hours. The positive electrode was removed, rinsed with dimethyl carbonate, and dried in vacuum. The resulting positive electrode was analyzed by X-ray photoelectron spectroscopy. In the analysis by X-ray photoelectron spectroscopy, the F is peak was used for the energy correction of a spectrum. Specifically, F is spectrum of a sample was measured. Waveform analysis was performed. The position of a main peak located on the minimum binding energy side was defined as 687.6 eV. The waveform analysis was performed with commercially available software.

For the positive electrode after one cycle in each of Examples 1-1 and 1-2, the measurement results demonstrated that a binding-energy peak in a phosphorus 2p spectrum was in the range of 132 to 135 eV. For the positive electrode after storage at 90° C., the measurement results demonstrated that the binding-energy peak in the phosphorus 2p spectrum was in the range of 135 to 138 eV. That is, in each of Examples 1-1 and 1-2, the coating containing a first compound for which a binding-energy peak in a phosphorus 2p spectrum obtained by X-ray photoelectron spectroscopy was in the range of 132 to 135 eV was formed. The coating was decomposed during the high-temperature storage. The coating containing a second compound for which a binding-energy peak in a phosphorus 2p spectrum obtained by X-ray photoelectron spectroscopy was in the range of 135 to 138 eV was obtained.

As shown in Table 1, in each of Examples 1-1 and 1-2 in which the coatings were formed, the amount of expansion was reduced compared with that in Comparative Example 1-1 in which the coating was not formed. The initial capacity and the capacity retention rate after storage in each of Examples 1-1 and 1-2 were equivalent or superior to those in Comparative Example 1-1. That is, the results demonstrated that the formation of the coating containing the first compound for which the binding-energy peak in the phosphorus 2p spectrum obtained by X-ray photoelectron spectroscopy was in the range of 132 to 135 eV resulted in a high capacity and the suppression of the expansion of the cell.

As shown in Table 1, in each of Examples 1-1 and 1-2 and Comparative Example 1-1 in which lithium hexafluorophosphate ($LiPF_6$), which was an example of an electrolyte salt having a satisfactory effect of decomposing the coating containing the first compound for which the binding-energy peak in the phosphorus 2p spectrum obtained by X-ray photoelectron spectroscopy was in the range of 132 to 135 eV, was used, the amount of expansion was reduced compared with those in each of Comparative Examples 1-2, 1-3, and 1-4 in which lithium perchlorate ($LiClO_4$), which was an example of an electrolyte salt not having a satisfactory effect of decomposing the coating containing the first compound for which the binding-energy peak in the phosphorus 2p spectrum obtained by X-ray photoelectron spectroscopy was in the range of 132 to 135 eV, was used. The initial capacity and the capacity retention rate after storage in each of Examples 1-1 and 1-2 and Comparative Example 1-1 were equivalent or superior to those in each of Comparative Examples 1-2, 1-3, and 1-4.

Operations as described in Examples and Comparative Examples below were made to produce nonaqueous electrolyte secondary cells including laminate housing as shown in FIGS. 1 and 2. Then, the performance of the resulting cells was evaluated.

Example 2-1

First, 91 parts by mass of a lithium-cobalt composite oxide ($LiCoO_2$) powder as a positive-electrode active material, 6 parts by mass of graphite as a conducting agent, and 3 percent by mass of polyvinylidene fluoride as a binder were mixed and dispersed in N-methyl-2-pyrrolidone as a dispersant to form a positive-electrode mixture slurry.

The resulting positive-electrode mixture slurry was applied to aluminum foil as a positive-electrode current collector, dried, and compression-molded to form a positive-electrode active material layer. Thereby, a positive electrode was formed.

Next, 90 parts by mass of an artificial graphite powder as a negative-electrode active material and 10 parts by mass of polyvinylidene fluoride as a binder were mixed and dispersed in N-methyl-2-pyrrolidone as a dispersant to form a negative-electrode mixture slurry. The resulting negative-electrode mixture slurry was applied on copper foil as a negative-electrode current collector, dried, and compression-molded to form a negative-electrode active material layer, thereby forming a nonaqueous electrolyte.

A nonaqueous electrolyte containing a polymer and a nonaqueous electrolytic solution containing an electrolyte salt and a nonaqueous solvent was applied on the positive electrode and the nonaqueous electrolyte to form nonaqueous electrolyte layers.

A mixed solvent of 20:20:30:30:1 ethylene carbonate/propylene carbonate/ethylmethyl carbonate/diethyl carbonate/vinylene carbonate (volume ratio) was prepared as the nonaqueous solvent. Lithium hexafluorophosphate ($LiPF_6$) was prepared as the electrolyte salt. Phosphorous acid ($H_3PO_3$) was prepared as the precursor of a first compound for which a binding-energy peak in a phosphorus 2p spectrum obtained by X-ray photoelectron spectroscopy was in the range of 132 to 135 eV.

The nonaqueous electrolytic solution having a phosphorous acid concentration of 0.3% was made by dissolving the electrolyte salt in the nonaqueous solvent so as to have a concentration of 0.9 mol/kg. A copolymer of vinylidene fluoride and hexafluoropropylene was used as the polymer.

A positive-electrode lead and a negative-electrode lead were attached to the positive electrode and the nonaqueous electrolyte, respectively. The positive electrode and the nonaqueous electrolyte were laminated with separators. The resulting laminate was rolled to form a cell element. The cell element was placed in a housing formed of a laminate film. A charge/discharge operation was performed to form a coating on the positive electrode. Thereby, a nonaqueous electrolyte secondary cell according to Example 2-1 was obtained.

With respect to a charge, a constant current charge was continued at a constant current of 1 C until the cell voltage reaches 4.2 V. Then constant voltage charge was continued at 4.2 V until the current reaches 1 mA. With respect to a discharge, a constant current discharge was continued at a constant current of 1 C until the cell voltage reaches 3.0 V. The term "1 C" refers to a current value when the theoretical capacity is completely discharged for one hour.

Example 2-2

A nonaqueous electrolyte secondary cell according to Example 2-2 was prepared as in Example 2-1, except that hypophosphorous acid ($H_3PO_2$) was used in place of phosphorous acid ($H_3PO_3$) as the precursor of the first compound for which the binding-energy peak in the phosphorus 2p spectrum obtained by X-ray photoelectron spectroscopy was in the range of 132 to 135 eV.

Example 2-3

A nonaqueous electrolyte secondary cell according to Example 2-3 was prepared as in Example 2-2, except that when the charge/discharge operation was performed to form the coating on the positive electrode, with respect to the charge, the constant current charge was continued at a constant current of 0.1 C until the cell voltage reaches 4.2 V. Then constant voltage charge was continued at 4.2 V until the current reaches 1 mA. With respect to the discharge, the constant current discharge was continued at a constant current of 0.1 C until the cell voltage reaches 3.0 V. The term "0.1 C" refers to a current value when the theoretical capacity is completely discharged for 10 hours.

Example 2-4

A nonaqueous electrolyte secondary cell according to Example 2-4 was prepared as in Example 2-2, except that when the charge/discharge operation was performed to form the coating on the positive electrode, with respect to the charge, the constant current charge was continued at a constant current of 0.5 C until the cell voltage reaches 4.2 V. Then constant voltage charge was continued at 4.2 V until the current reaches 1 mA. With respect to the discharge, the constant current discharge was continued at a constant current of 0.5 C until the cell voltage reaches 3.0 V. The term "0.5 C" refers to a current value when the theoretical capacity is completely discharged for two hours.

Example 2-5

A nonaqueous electrolyte secondary cell according to Example 2-5 was prepared as in Example 2-2, except that when the charge/discharge operation was performed to form the coating on the positive electrode, with respect to the charge, the constant current charge was continued at a constant current of 2 C until the cell voltage reaches 4.2 V. Then constant voltage charge was continued at 4.2 V until the current reaches 1 mA. With respect to the discharge, the constant current discharge was continued at a constant current of 2 C until the cell voltage reaches 3.0 V. The term "2 C" refers to a current value when the theoretical capacity is completely discharged for 0.5 hours.

Example 2-6

A nonaqueous electrolyte secondary cell according to Example 2-6 was prepared as in Example 2-2, except that when the charge/discharge operation was performed to form the coating on the positive electrode, with respect to the charge, the constant current charge was continued at a constant current of 3 C until the cell voltage reaches 4.2 V. Then constant voltage charge was continued at 4.2 V until the current reaches 1 mA. With respect to the discharge, the constant current discharge was continued at a constant current of 3 C until the cell voltage reaches 3.0 V. The term "3 C" refers to a current value when the theoretical capacity is completely discharged for ⅓ hours.

Comparative Example 2-1

A nonaqueous electrolyte secondary cell according to Comparative Example 2-1 was prepared as in Example 2-1, except that lithium perchlorate ($LiClO_4$) was used in place of lithium hexafluorophosphate ($LiPF_6$) as the electrolyte salt.

Comparative Example 2-2

A nonaqueous electrolyte secondary cell according to Comparative Example 2-2 was prepared as in Example 2-2, except that lithium perchlorate ($LiClO_4$) was used in place of lithium hexafluorophosphate ($LiPF_6$) as the electrolyte salt. Table 2 shows specifications of the above-described Examples and Comparative Examples and specifications of Comparative Examples 1-1 and 1-2.

Performance Evaluation

In each of the nonaqueous electrolyte secondary cells according to Examples and Comparative Examples, the initial capacity, the amount of expansion during high-temperature storage, and the capacity retention rate were examined.

The term "initial capacity" refers to a discharge capacity in the first cycle of a charge/discharge operation at 23° C. With respect to a charge, a constant current charge was continued at a constant current of 1 C until the cell voltage reaches 4.2 V. Then constant voltage charge was continued at 4.2 V until the current reaches 1 mA. With respect to a discharge, a constant current discharge was continued at a constant current of 1 C until the cell voltage reaches 3.0 V. The term "1 C" refers to a current value when the theoretical capacity is completely discharged for one hour.

The amount of expansion during the high-temperature storage was determined as follows: After one cycle of the charge/discharge operation was performed under the above-described conditions and then the thickness of the cell was measured before storage, the cell was recharged. The resulting cell was stored at 90° C. for 4 hours. The thickness of the cell after storage was measured. The thickness of the cell after storage was subtracted from the thickness of the cell before storage to obtain the amount of expansion.

The capacity retention rate after the high-temperature storage was determined as follows: After one cycle of the charge/discharge operation was performed under the above-described conditions, the cell was recharged. The resulting cell was stored at 90° C. for 4 hours. The cell was discharged again under the above-described conditions. The capacity after storage was measured. The ratio (%) of the capacity after storage to the initial capacity was measured. The results were summarized in Table 1 with the results of Comparative Examples 1-1 and 1-2.

TABLE 2

| | Type of electrolyte salt | Coating | Initial capacity (mAh) | Amount of expansion (mm) | Capacity retention rate after high-temperature storage (%) |
|---|---|---|---|---|---|
| Example 2-1 | $LiPF_6$ | Present | 863 | 0.3 | 92.5 |
| Example 2-2 | $LiPF_6$ | Present | 864 | 0.3 | 92.7 |
| Example 2-3 | $LiPF_6$ | Present | 863 | 0.2 | 92.4 |
| Example 2-4 | $LiPF_6$ | Present | 861 | 0.3 | 92.2 |
| Example 2-5 | $LiPF_6$ | Present | 832 | 0.6 | 91.4 |
| Example 2-6 | $LiPF_6$ | Present | 763 | 0.9 | 90.9 |
| Comparative Example 2-1 | $LiClO_4$ | Present | 861 | 2.9 | 92.0 |
| Comparative Example 2-2 | $LiClO_4$ | Present | 862 | 2.6 | 91.7 |
| Comparative Example 1-1 | $LiPF_6$ | Absent | 860 | 1.1 | 91.3 |
| Comparative Example 1-2 | $LiClO_4$ | Absent | 861 | 3.2 | 91.6 |

Figure 3:
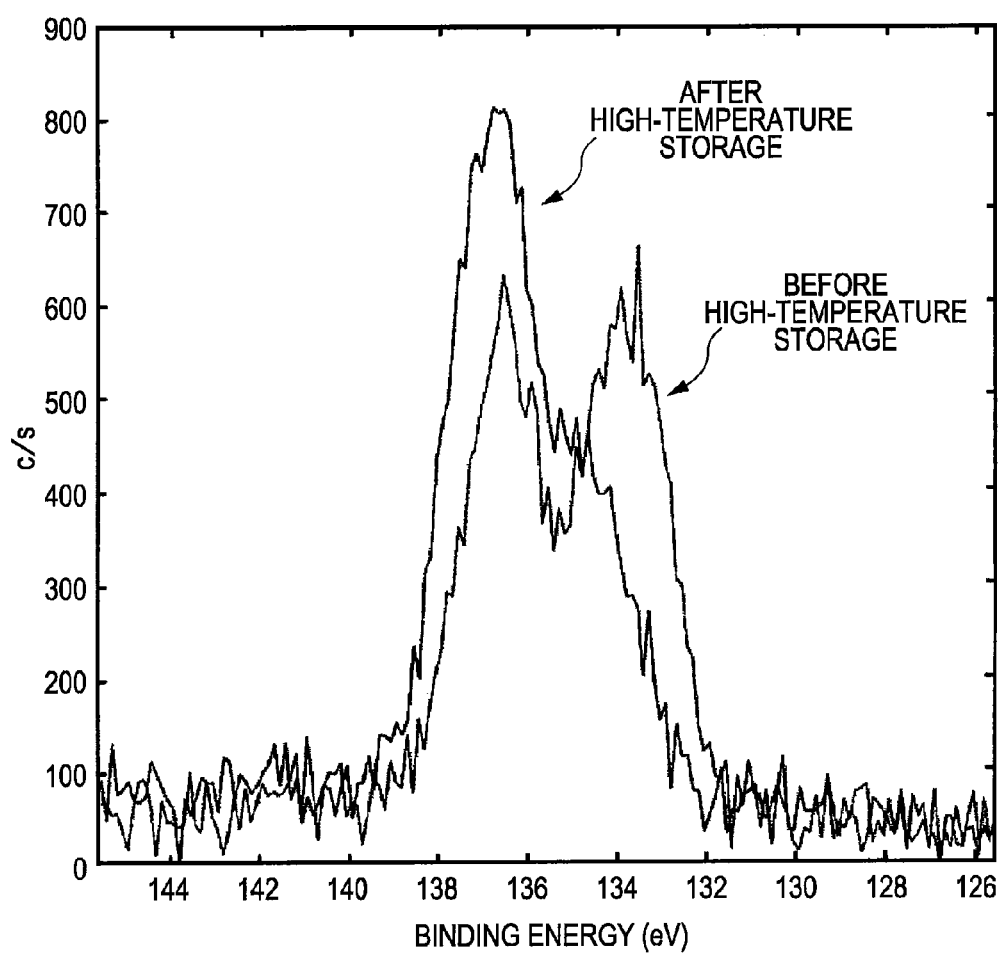
FIG. 3 is a graph showing measurement results of a positive electrode according to Example 2-2 obtained by X-ray photoelectron spectroscopy.

Each of the positive electrodes in Examples 2-1 to 2-6 was removed by performing one cycle of the charge/discharge operation, performing one cycle of the charge/discharge operation once again, storing the cell at 90° C. for 4 hours, and disassembling the secondary cell, in the same way as in Examples 1-1 and 1-2. The resulting positive electrode was analyzed by X-ray photoelectron spectroscopy. For the positive electrode after one cycle in each of Example 2-1 to 2-6 in the same way as in Examples 1-1 and 1-2, the measurement results demonstrated that a binding-energy peak in a phosphorus 2p spectrum was in the range of 132 to 135 eV. For the positive electrode after storage at 90° C., the measurement results demonstrated that the binding-energy peak in the phosphorus 2p spectrum was in the range of 135 to 138 eV. That is, the coating containing a first compound for which a binding-energy peak in a phosphorus 2p spectrum obtained by X-ray photoelectron spectroscopy was in the range of 132 to 135 eV was formed. The coating was decomposed during the high-temperature storage. The coating containing a second compound for which a binding-energy peak in a phosphorus 2p spectrum obtained by X-ray photoelectron spectroscopy was in the range of 135 to 138 eV was obtained. FIG. 3 shows spectra obtained by X-ray photoelectron spectroscopy in Example 2-2.

As shown in Table 2, in each of Examples 2-1 to 2-6 in which the coatings were formed, the amount of expansion was reduced compared with that in Comparative Example 1-1 in which the coating was not formed. The initial capacity and the capacity retention rate after storage in each of Examples 2-1 to 2-6 were substantially equivalent or superior to those in Comparative Example 1-1. That is, the results demonstrated that the formation of the coating containing the first compound for which the binding-energy peak in the phosphorus 2p spectrum obtained by X-ray photoelectron spectroscopy was in the range of 132 to 135 eV resulted in a high capacity and the suppression of the expansion.

As shown in Table 2, in each of Comparative Examples 2-1 and 2-2 in which the coatings were formed, the amount of expansion was reduced compared with that in Comparative Example 1-2 in which the coating was not formed. The initial capacity and the capacity retention rate after storage in each of Examples 2-1 to 2-6 were equivalent or superior to those in Comparative Example 1-1. That is, the results demonstrated that the formation of the coating containing the first compound for which the binding-energy peak in the phosphorus 2p spectrum obtained by X-ray photoelectron spectroscopy was in the range of 132 to 135 eV resulted in a high capacity and the suppression of the expansion.

As shown in Table 2, in each of Examples 2-1 and 2-2 in which lithium hexafluorophosphate ($LiPF_6$), which was an example of an electrolyte salt having a satisfactory effect of decomposing the coating containing the first compound for which the binding-energy peak in the phosphorus 2p spectrum obtained by X-ray photoelectron spectroscopy was in the range of 132 to 135 eV, was used, the amount of expansion was reduced compared with those in each of Comparative Examples 2-1 and 2-2 in which lithium perchlorate ($LiClO_4$), which was an example of an electrolyte salt not having a satisfactory effect of decomposing the coating containing the first compound for which the binding-energy peak in the phosphorus 2p spectrum obtained by X-ray photoelectron spectroscopy was in the range of 132 to 135 eV, was used. The initial capacity and the capacity retention rate after storage in each of Examples 2-1 and 2-2 were equivalent or superior to those in each of Comparative Examples 2-1 and 2-2. That is, the results demonstrated that the formation of the coating containing the first compound for which the binding-energy peak in the phosphorus 2p spectrum obtained by X-ray photoelectron spectroscopy was in the range of 132 to 135 eV resulted in a high capacity and the suppression of the expansion.

Furthermore, as shown in Table 2, in each of Examples 2-3 and 2-4 in which each coating was formed by passing a current at a small current density among Examples 2-1 to 2-6, the amount of expansion was reduced. This may be because smaller current densities resulted in more uniform coatings.

The embodiments have been described by means of Examples. However, the embodiments are not limited thereto. Various changes may be made without departing from the scope of the invention.

For example, in each of the above-described embodiments and Examples, the nonaqueous gel electrolyte in which the nonaqueous electrolytic solution was retained in the polymer was used. The nonaqueous electrolytic solution, which is a liquid nonaqueous electrolyte, may be used as it is. In addition, a nonaqueous electrolyte having another composition, for example, an organic solid electrolyte having an electrolyte salt dispersed in an ion-conducting organic polymer or a mixture of an inorganic solid electrolyte containing an ion-conducting inorganic compound and a nonaqueous electrolytic solution, may be used. The embodiments can also be applied to such a nonaqueous electrolyte.

Furthermore, in each of the above-described embodiments and Examples, the cell having the rolled electrodes has been described. However, the embodiments can also be applied to a cell having another structure such as a laminated structure.

Moreover, in each of the above-described embodiments and Examples, the film housing was used. Alternatively, a housing formed of a can may be used. The housing may have any shape, for example, a cylinder, a prism, a coin, or a button.

Furthermore, the present embodiments can also be applied to another cell such as a primary cell, in addition to the secondary cells.

As described above, the present embodiments relate to the cell including lithium as a material participating in the electrode reaction. The technical idea of the embodiments can also be applied to a cell including another alkali metal, such as sodium (Na) or potassium (K), an alkaline earth metal, such as magnesium (Mg) or calcium (Ca), or a light metal, such as aluminum.

It should be understood by those skilled in the art that various modifications, combinations, sub-combinations and alterations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A positive electrode including a positive-electrode active material and being used for a nonaqueous electrolyte cell, the positive electrode comprising:
    a coating, wherein:
    the coating contains at least one first compound for which a binding-energy peak in a phosphorus 2p spectrum obtained by X-ray photoelectron spectroscopy is in the range of 132 to 135 eV, the first compound being selected from the group consisting of: $Li_2HPO_3$, $Li_3PO_3$, $LiH_2PO_3$, $LiH_2PO_2$, $Li_2HPO_2$ and $Li_3PO_2$,
    the positive electrode includes a positive-electrode active material layer containing the positive-electrode material, and
    the coating is disposed on a surface of the positive-electrode active material layer or on surfaces of particles of the positive-electrode active material.

2. The positive electrode for a nonaqueous electrolyte cell according to claim 1, wherein the coating further contains at least one second compound for which a binding-energy peak in a phosphorus 2p spectrum obtained by X-ray photoelectron spectroscopy is in the range of 135 to 138 eV, the second compound being selected from the group consisting of: $Li_2PO_3F$ and $LiPO_2F_2$.

3. The positive electrode for a nonaqueous electrolyte cell according to claim 1, wherein the positive-electrode active material is a lithium composite oxide.

4. A nonaqueous electrolyte cell comprising:
    a positive electrode containing a positive-electrode active material;
    a negative electrode containing a negative-electrode active material;
    a nonaqueous electrolyte containing an electrolyte salt; and a housing accommodating the positive electrode, the negative electrode, and the nonaqueous electrolyte, wherein:

the positive electrode includes a coating, the coating containing at least one first compound for which a binding-energy peak in a phosphorus 2p spectrum obtained by X-ray photoelectron spectroscopy is in the range of 132 to 135 eV, the first compound being selected from the group consisting of: $Li_2HPO_3$, $Li_3PO_3$, $LiH_2PO_3$, $LiH_2PO_2$, $Li_2HPO_2$ and $Li_3PO_2$, the positive electrode includes a positive-electrode active material layer containing the positive-electrode material, and the coating is disposed on a surface of the positive-electrode active material layer or on surfaces of particles of the positive-electrode active material, and the electrolyte salt contains lithium hexafluorophosphate.

5. The nonaqueous electrolyte cell according to claim 4, wherein when the electrolyte salt is dissolved in a nonaqueous solvent, the electrolyte salt shows Lewis acid properties.

6. The nonaqueous electrolyte cell according to claim 4, wherein the electrolyte salt is lithium hexafluorophosphate.

7. The nonaqueous electrolyte cell according to claim 4, wherein the coating further contains at least one second compound for which a binding-energy peak in a phosphorus 2p spectrum obtained by X-ray photoelectron spectroscopy is in the range of 135 to 138 eV, the second compound being selected from the group consisting of: $Li_2PO$ and $LiPO_2F_2$.

8. The nonaqueous electrolyte cell according to claim 7, wherein the at least one second compound is formed by reaction of the first compound and the electrolyte salt.

9. The nonaqueous electrolyte cell according to claim 4, wherein the housing is formed of a can having a prismatic shape or is a laminate film.

10. The positive electrode for a nonaqueous electrolyte cell according to claim 1, wherein the first compound is selected from the group consisting of $Li_2HPO_3$ and $LiH_2PO_2$.

11. The nonaqueous electrolyte cell according to claim 4, wherein the first compound is selected from the group consisting of $Li_2HPO_3$ and $LiH_2PO_2$.

12. A positive electrode including a positive-electrode active material and being used for a nonaqueous electrolyte cell, the positive electrode comprising:

a coating, wherein the coating contains at least one first compound for which a binding-energy peak in a phosphorus 2p spectrum obtained by X-ray photoelectron spectroscopy is in the range of 132 to 135 eV, the first compound being selected from the group consisting of: $Li_2HPO_3$ and $LiH_2PO_2$.

13. A nonaqueous electrolyte cell comprising:

a positive electrode containing a positive-electrode active material;

a negative electrode containing a negative-electrode active material;

a nonaqueous electrolyte containing an electrolyte salt; and a housing accommodating the positive electrode, the negative electrode, and the nonaqueous electrolyte, wherein the positive electrode includes a coating, the coating containing at least one first compound for which a binding-energy peak in a phosphorus 2p spectrum obtained by X-ray photoelectron spectroscopy is in the range of 132 to 135 eV, the first compound being selected from the group consisting of: $Li_2HPO_3$ and $LiH_2PO_2$.

* * * * *